United States Patent  
Oh et al.

(10) Patent No.: US 8,193,672 B2
(45) Date of Patent: Jun. 5, 2012

(54) INTERIOR PERMANENT MAGNET TYPE BRUSHLESS DIRECT CURRENT MOTOR

(75) Inventors: Seung-Suk Oh, Seoul (KR); Jin-Soo Park, Seoul (KR)

(73) Assignee: LG Electronics Inc., Seoul (KR)

( * ) Notice: Subject to any disclaimer, the term of this patent is extended or adjusted under 35 U.S.C. 154(b) by 360 days.

(21) Appl. No.: 12/607,168

(22) Filed: Oct. 28, 2009

(65) Prior Publication Data

US 2010/0148624 A1    Jun. 17, 2010

(30) Foreign Application Priority Data

Dec. 15, 2008  (KR) .......................... 10-2008-0127497

(51) Int. Cl.
*H02K 1/27* (2006.01)

(52) U.S. Cl. ......... 310/156.07; 310/156.54; 310/156.84; 310/216.106

(58) Field of Classification Search ............. 310/156.06, 310/156.07, 156.15, 156.24, 156.34–156.46, 310/156.49, 156.53–156.58, 156.83, 216.076, 310/216.106–216.108, 216.111
See application file for complete search history.

(56) References Cited

U.S. PATENT DOCUMENTS

| 5,097,166 | A  | * | 3/1992  | Mikulic ................... 310/156.83 |
| 6,025,667 | A  | * | 2/2000  | Narita et al. ............. 310/156.53 |
| 6,208,054 | B1 |   | 3/2001  | Tajima |
| 6,218,753 | B1 | * | 4/2001  | Asano et al. ............. 310/156.53 |
| 6,836,045 | B2 | * | 12/2004 | Murakami et al. ........ 310/156.53 |
| 6,891,300 | B2 | * | 5/2005  | Noda et al. ............... 310/156.78 |
| 7,119,507 | B2 | * | 10/2006 | Nishijima ................ 318/400.41 |
| 7,425,786 | B2 | * | 9/2008  | Hino et al. ............... 310/156.57 |
| 7,876,018 | B2 | * | 1/2011  | Oh et al. .................... 310/261.1 |
| 2006/0145556 | A1 |   | 7/2006  | Aota |
| 2006/0279158 | A1 | * | 12/2006 | Kim ............................ 310/216 |
| 2007/0120434 | A1 | * | 5/2007  | Oh et al. ....................... 310/162 |
| 2008/0258573 | A1 | * | 10/2008 | Kamiya ................... 310/156.02 |
| 2008/0272667 | A1 | * | 11/2008 | Ionel et al. .............. 310/156.83 |
| 2010/0166575 | A1 | * | 7/2010  | Fukuda et al. ............. 417/410.1 |

FOREIGN PATENT DOCUMENTS

EP    1566876 A1    8/2005
JP    10-014190 A    1/1998

OTHER PUBLICATIONS

European Search Report dated Feb. 8, 2011 for Application No. 09179026.1, 9 pages.

* cited by examiner

*Primary Examiner* — Quyen Leung
*Assistant Examiner* — Naishadh Desai
(74) *Attorney, Agent, or Firm* — Fish & Richardson P.C.

(57) ABSTRACT

Disclosed is an interior permanent magnet type brushless direct current (BLDC) motor including a stator having a plurality of slots wound in a distributed winding manner, and a rotor positioned in the stator, configured to rotate with respect to the stator, and having a rotor core, a plurality of permanent magnets inserted in the rotor core and a plurality of flux barriers, wherein a flux barrier angle of the rotor is determined by multiples of twenty as an electrical angle and the multiples of twenty relates to a number of slots of the stator.

4 Claims, 4 Drawing Sheets

INTERIOR PERMANENT MAGNET TYPE BRUSHLESS DIRECT CURRENT MOTOR

CROSS-REFERENCE TO RELATED APPLICATIONS

The present application claims the benefit of priority to Korean Application No. 10-2008-0127497, filed on Dec. 15, 2008, the contents of which is incorporated by reference herein in its entirety.

FIELD

The present disclosure relates to an interior permanent magnet type brushless direct current (BLDC) motor.

BACKGROUND

Motors may be classified into a direct current (DC) motor and an alternating current (AC) motor depending on power used. The DC motor has a commutator and a brush. Due to a mechanical contact between the commutator and the brush, reliability of the DC motor is lowered and a lifespan thereof may be shortened.

An electronic switching type brushless DC (BLDC) motor using a semiconductor device has widely been used. The BLDC motors may be classified into an interior rotor type and an exterior rotor type according to an arrangement of stator and rotor.

The interior rotor type motor either uses a rotor that a rotation shaft is inserted into a center of a cylindrical permanent magnet, or uses a so-called interior permanent magnet type rotor that a rotation shaft is inserted into a center of a rotor core having electrical steel sheets stacked thereon and then a plurality of permanent magnets are inserted in the rotor core. A cogging torque is generated between the rotor having the permanent magnets and the stator when the motor operates. The cogging torque causes vibration and noise.

SUMMARY

In one aspect, an interior permanent magnet type brushless direct current (BLDC) motor includes a stator having a plurality of slots. The BLDC motor also includes a rotor positioned in the stator, configured to rotate with respect to the stator, and having a rotor core, a plurality of permanent magnets inserted in the rotor core and a plurality of flux barriers, wherein a flux barrier angle of the rotor is determined by multiples of twenty as an electrical angle and the multiples of twenty relates to a number of slots of the stator.

Implementations may include one or more of the following features. For example, the multiples of twenty are used when $S_n/(P \times m) = 3n(n=1, 2, 3 \ldots)$ and where Sn is the number of slots of the stator, P is the number of poles of the rotor, and m is the number of power phases. The stator has thirty-six slots, three-phase distributed winding and the rotor has four poles.

In some implementations, the flux barrier angle of the rotor is in a range around 160° as the electrical angle. The flux barrier angle of the rotor is in a range between 158° and 162° as the electrical angle. The flux barrier angle is determined by a size of the flux barriers.

In another aspect, an interior permanent magnet type brushless direct current (BLDC) motor includes a stator having a plurality of slots. The BLDC motor also includes a rotor positioned in the stator, configured to rotate with respect to the stator, and having a rotor core, a plurality of permanent magnets inserted in the rotor core and a plurality of flux barriers, wherein a flux barrier angle of the rotor is determined by odd multiples of ten as an electrical angle and the odd multiples of ten relates to a number of slots of the stator.

Implementations may include one or more of the following features. For example, the odd multiples of ten are used when $S_n/(P \times m) = 2n(n=1, 2, 3 \ldots)$ where Sn is the number of slots of the stator, P is the number of poles of the rotor, and m is the number of power phases. The stator has twenty-four slots, three phase distributed winding and the rotor has four poles. The flux barrier angle of the rotor is in a range around 150° as the electrical angle. The flux barrier angle of the rotor is in a range between 148° and 152° as the electrical angle. The flux barrier angle is determined by a size of a flux barrier.

In yet another aspect, an interior permanent magnet type brushless direct current (BLDC) motor includes a stator having a plurality of slots. The BLDC motor also includes a rotor positioned in the stator, configured to rotate with respect to the stator, and having a rotor core, a plurality of permanent magnets inserted in the rotor core and a plurality of flux barriers, wherein a flux barrier angle of the rotor is determined by multiples of twenty or odd multiples of ten as an electrical angle in response to a number of slots of the stator.

Implementations may include one or more of the following features. For example, the flux barrier angle of the rotor is in a range around 160° when determined by multiples of twenty. The flux barrier angle of the rotor is in a range around 150° in case of determined by multiples of twenty.

In yet another aspect, an interior permanent magnet type brushless direct current (BLDC) motor includes a stator having a plurality of slots. The BLDC motor also includes a rotor positioned in the stator, configured to rotate with respect to the stator, and having a rotor core, a plurality of permanent magnets inserted in the rotor core and a plurality of flux barriers, wherein a flux barrier angle of the rotor increases as a number of slots of the stator increases.

DETAILED DESCRIPTION

Figure 1:
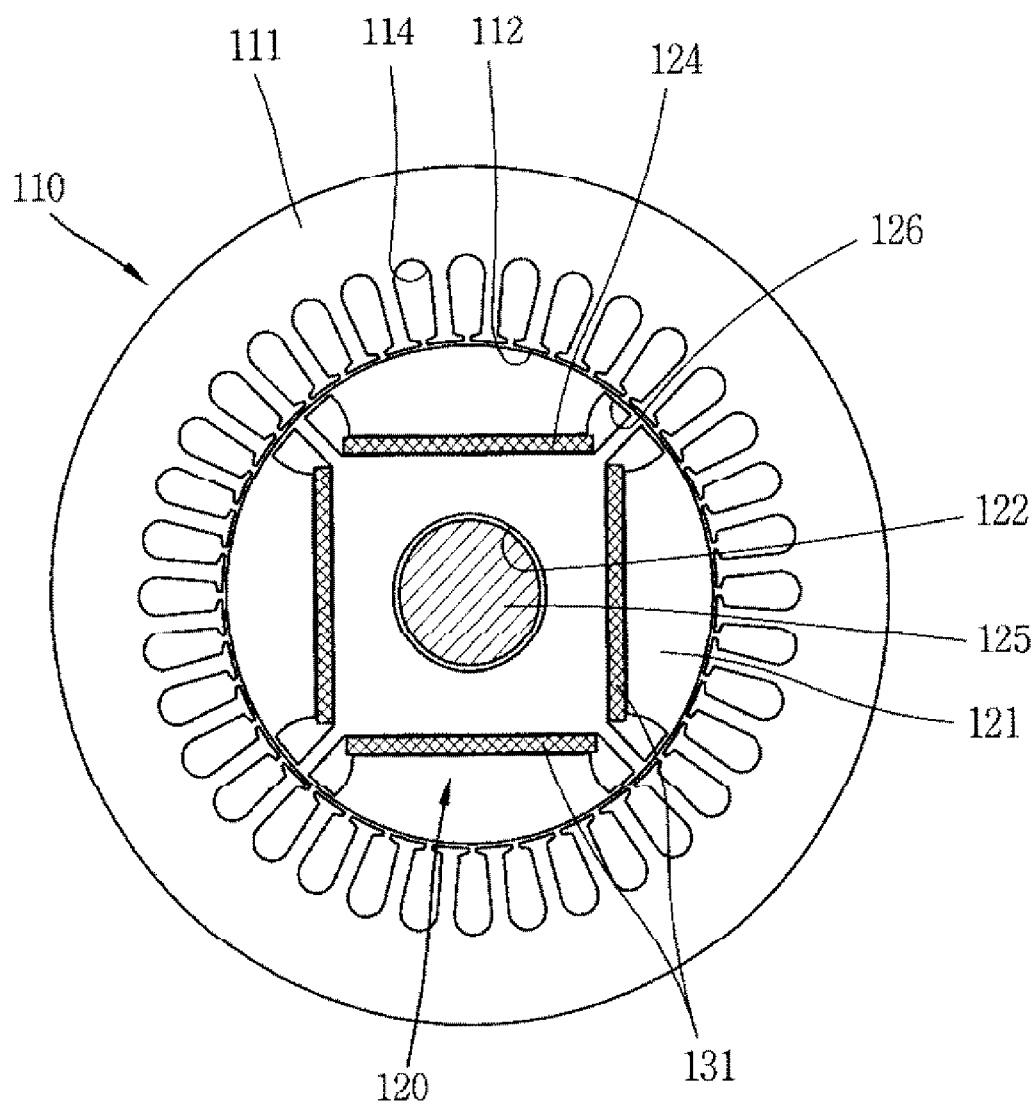
FIG. 1 is a plane view of an interior permanent magnet type brushless direct current (BLDC) motor.
Figure 2:
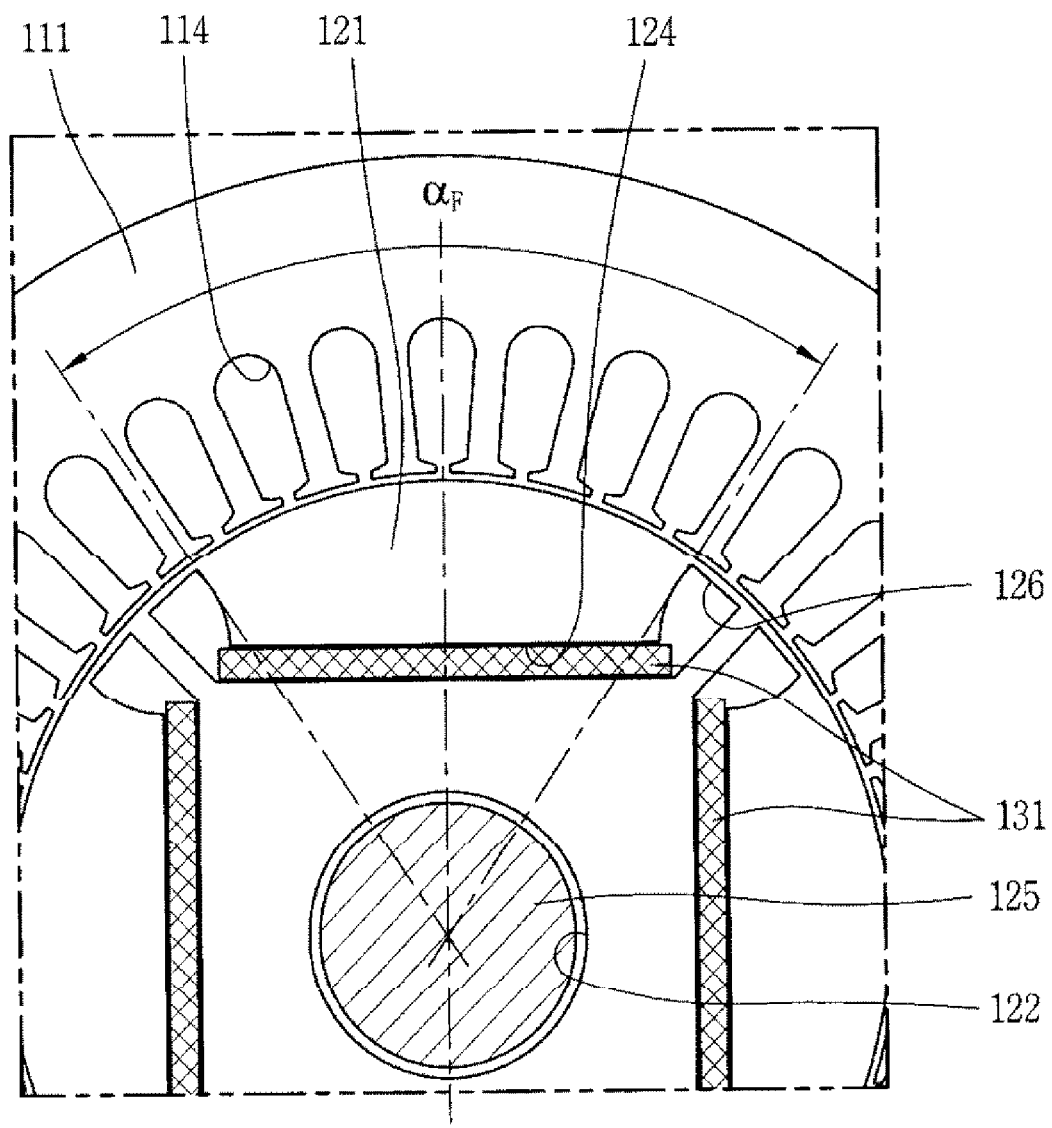
FIG. 2 is an enlarged view of main parts of FIG. 1.

Referring to FIGS. 1 and 2, the interior permanent magnet type BLDC motor may include a stator 110 having a plurality of slots 114, and a rotor 120 having a rotor core 121. Permanent magnets 131 having a plurality of magnetic poles are positioned in the rotor core 121.

The stator 110 may include a stator accommodation hole 112 for accommodating the rotor 120, a stator core 111 having a plurality of slots 114 and a plurality of teeth positioned around the stator accommodation hole 112, and a stator coil wound on the plurality of slots 114. The stator 110 may have various slot numbers, e.g., twenty-four slots, thirty-six slots, forty-eight slots, or the like. Hereinafter, as an example, the stator 110 has thirty-six slots and a coil type of the stator 110 is a distributed winding, which is coil is wound on a plurality of teeth simultaneously.

The rotor 120 may include a rotor core 121 defined in a cylindrical shape and having a rotation shaft 125 positioned in a center of the rotor core 121, and a plurality of permanent magnets 131 axially positioned in the rotor core 121. Here, with respect to an arrangement of the permanent magnets, different poles N and S are alternately located at an outside of the rotor core 121.

The rotor core 121 may have a shaft hole 122 passed through a center of the rotor core 121 and a plurality of electric steel sheets which are insulated and stacked in the rotor with a circular shape. In addition, a plurality of permanent magnet insertion portions 124 are positioned in the electrical steel sheets. The rotor 120 may have a plurality of magnetic poles. As an example, a rotor having four poles will be described.

Four permanent magnet insertion portions 124 in which four permanent magnets 131 are respectively inserted may be positioned at the rotor core 121. Each of the permanent magnet insertion portions 124 may be axially passed through the rotor core 121 to have a rectangular section such that the corresponding permanent magnet 131 defined in a shape of a rectangular plate can be axially inserted therein. The permanent magnet insertion portions 124 may be configured to be spaced apart from one another with approximately 90-degree interval in a circumferential direction of the rotor core 121.

Flux barriers 126 for preventing a flux leakage may be positioned at both end regions of each permanent magnet insertion portion 124. Each of the flux barriers 126 may be located from the end of each permanent magnet insertion portion 124 to a position near an outer circumference of the rotor core 121. The flux barrier 126 may be connected to the permanent magnet insertion portion 124.

The magnetic pole of the rotor 120 defined by each permanent magnet 131 has a predetermined flux barrier angle. The flux barrier angle is an inner angle between two lines that connect a center of the rotor 120 to both ends of the magnetic pole, respectively. As the flux barriers 126 for preventing the flux leakage are positioned at both end regions of the permanent magnet insertion portion 124, the flux barrier angle is substantially an inner angle between two lines which connect inner edges of the flux barriers 126 to the center of the rotor 120.

In this implementation, the flux barrier angle of the rotor 120 is properly changed in association with the number (P) of poles of the rotor 120, the number ($S_n$) of slots 114 of the stator 110, and the number (m) of power phases applied to the stator coil. If a motor has a proper flux barrier angle, the flux leakage is reduced and a cogging torque can be minimized without lowering the motor efficiency. Accordingly, vibration or noise is reduced when a rotor rotates.

A flux barrier angle $\alpha_F$ of the rotor 120 can be selected as a multiple of twenty as an electrical angle or an odd multiple of ten as the electrical angle based on a result of calculation, $S_n/(P \times m) = 3n$ or $2n$. Here, the electrical angle is defined as 360° when each of different magnetic poles N and S of the rotor 120 passes a reference point one time. For instance, if the rotor 120 has two poles, the electrical angle is 360° when a one-time rotation of the rotor 120 occurs. If the rotor 120 has four poles, the electrical angle is 720° when the one-time rotation of the rotor 120 occurs.

In case of $S_n/(P \times m) = 3n (n=1, 2, 3 \ldots)$, the flux barrier angle $\alpha_F$ may be, one of multiples of twenty ($\theta = 20 \times n(n=1, 2, 3 \ldots)$). Also, the flux barrier angle $\alpha_F$ may have a predetermined range (($\theta-2) < \alpha_F < (\theta-2)$). For example, if the number ($S_n$) of the slots 114 of the stator 110 is thirty-six, the number (P) of magnetic poles of the rotor 120 is four, and the number (m) of the power phases of the stator coil is three, the calculation can be the multiple of 3 ($36/(4 \times 3)$). Therefore, the flux barrier angle $\alpha_F$ of the interior permanent magnet type BLDC motor may be one of multiples of twenty as the electrical angle. In this implementation, as the rotor 120 has four poles and the electrical angle upon the one-time rotation of the rotor 120 is 720, so the electrical angle of a single pole may be smaller than or equal to 180°.

Further, the flux barriers for reducing the flux leakage are positioned at the rotor 120 and connected to the end of permanent magnets, respectively. The flux barrier angle $\alpha_F$ of the rotor 120 may have an electrical angle in the range of approximately 120° to 170° in consideration of the sizes of the permanent magnet insertion portions 124 and the flux barriers 126. Here, it is noticed that if the flux barrier angle of the rotor 120 is smaller than 120°, the flux leakage is increased. If the flux barrier angle of the rotor 12 0 exceeds 170°, the deformation and/or damage of the flux barriers 126 may be caused due to a weak mechanical strength.

Figure 3:
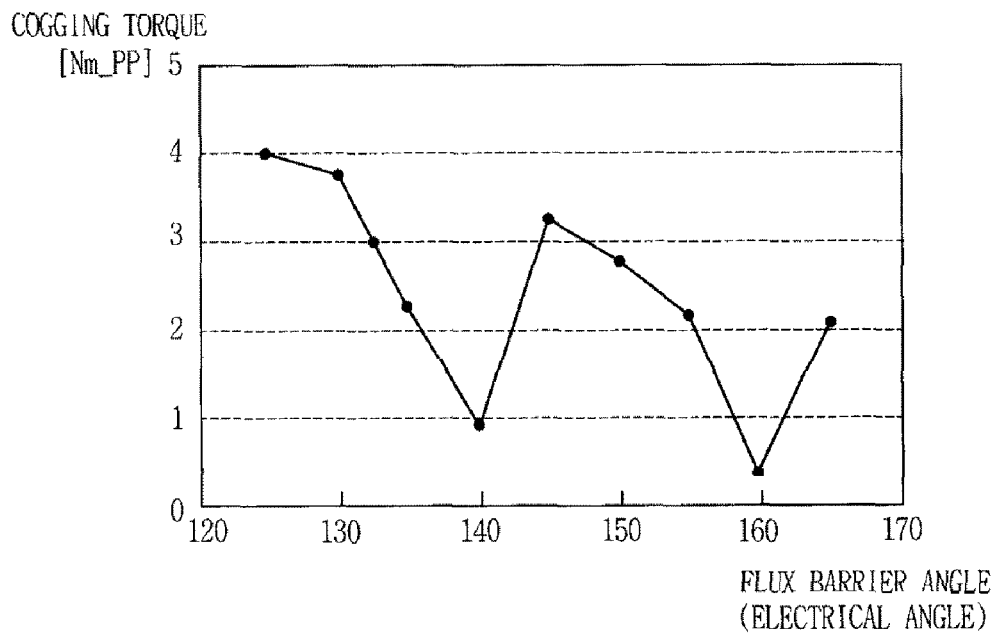
FIG. 3 is a view showing a cogging torque in association with changes in flux barrier angles.

Referring to FIG. 3, the cogging torque of the interior permanent magnet type BLDC motor is extremely high when the flux barrier angle $\alpha_F$ is 125° as the electrical angle, and decreases until the flux barrier angle $\alpha_F$ becomes 140°. The cogging torque is drastically increased until the flux barrier angle $\alpha_F$ exceeds 140° to become 145°. The cogging torque starts to be decreased again over 145° of the flux barrier angle $\alpha_F$, and is minimized at 160° of the flux barrier angle $\alpha_F$. Then, the cogging torque is drastically increased again between 160° and 165°.

Figure 4:
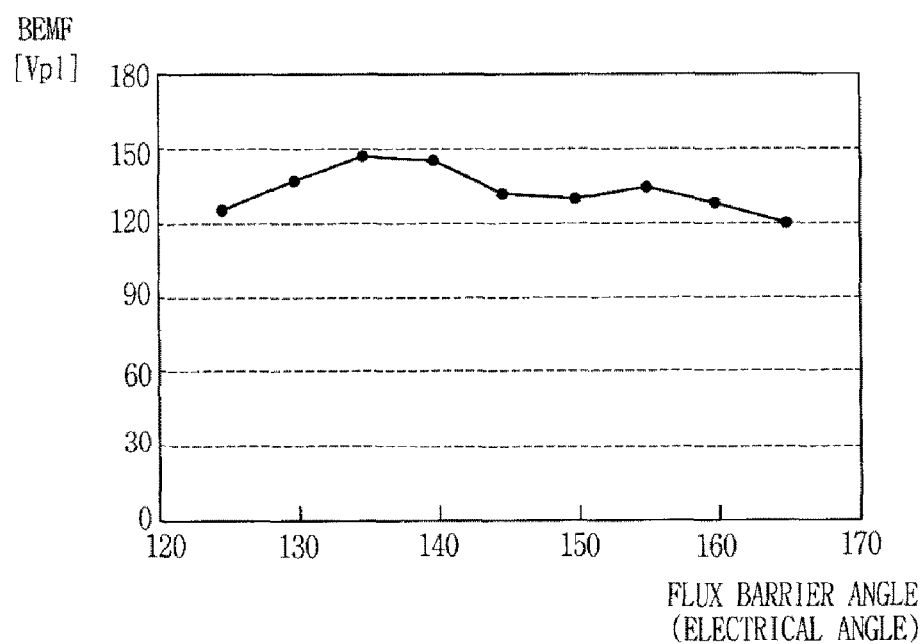
FIG. 4 is a view showing the changes in a back EMF in association with the changes in flux barrier angles.

Further, referring to FIG. 4, a back electromotive force (BEMF) of the interior permanent magnet type BLDC motor is relatively low when the flux barrier angle $\alpha_F$ of the rotor 120 is 125° as the electrical angle. The BEMF is increased until the flux barrier angle $\alpha_F$ of the rotor 120 becomes 135° and thereafter gradually decreased. The BEMF is maintained at a particular level until flux barrier angle $\alpha_F$ of the rotor 120 is 160°, and then decreased again.

Referring to FIGS. 3 and 4, it can be noticed that the interior permanent magnet type BLDC motor can minimize the cogging torque without lowering the motor efficiency when the flux barrier angle $\alpha_F$ of one pole of the rotor 120 is in the range around 160° (for example, between 158° and 162° as the electrical angle. Accordingly, the interior permanent magnet type BLDC motor can be more silently driven owing to a reduction of vibration and noise.

In addition, in case of $S_n/(P \times m) = 2n(n=1, 2, 3 \ldots)$, the flux barrier angle $\alpha_F$ may be, as an electrical angle, one of multiples of ten ($\theta = 5 \times n(n=2, 6, 10, \ldots)$). Also, the flux barrier angle $\alpha_F$ may have a predetermined range (($\theta-2) < \alpha_F < (8-2)$).

For example, if the number ($S_n$) of the slots 114 of the stator 110 is twenty-four, the number (P) of magnetic poles of the rotor 120 is four, and the number (m) of the power phases of the stator coil is three, the calculation can be the multiple of 2 ($24/(4 \times 3)$). Therefore, the flux barrier angle $\alpha_F$ of the interior permanent magnet type BLDC motor may be one of multiples of ten as the electrical angle.

Figure 5:
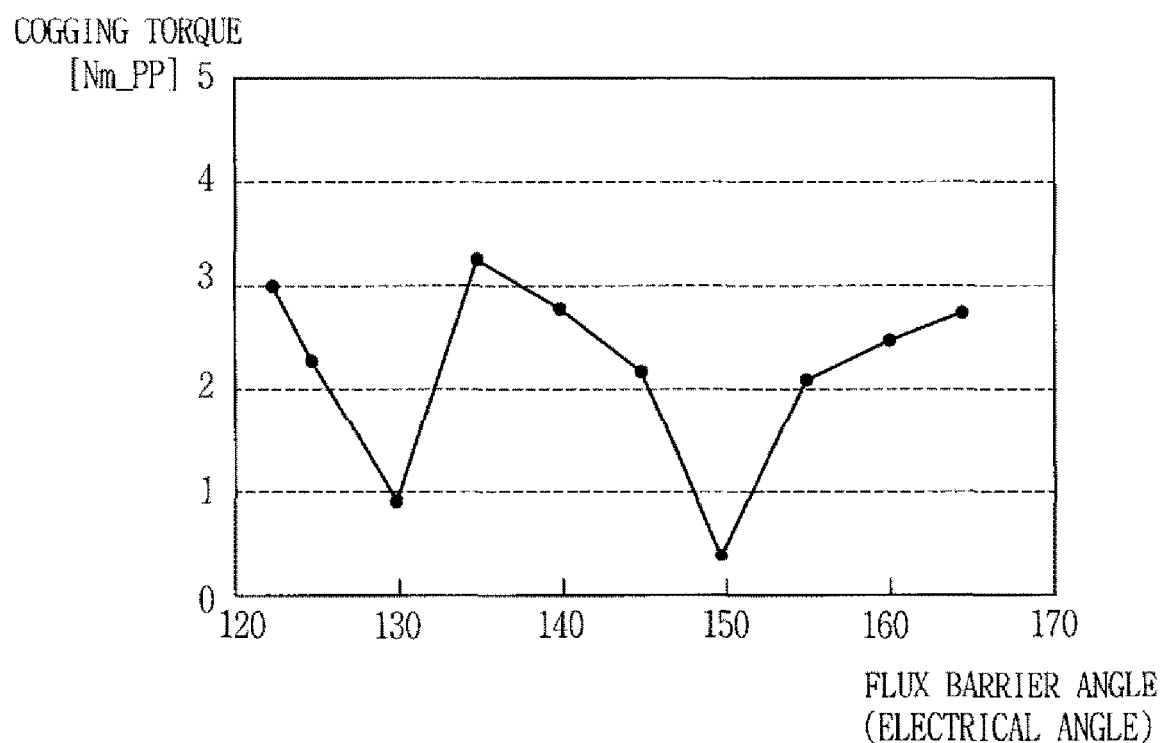
FIG. 5 is a view showing a cogging torque in association with changes in flux barrier angles.

Referring to FIG. 5, the flux barrier angle of the rotor 120 from 125° to 165° to observe the changes in the cogging torque and the BEMF, it can be seen that the cogging torque is minimized without lowering the motor efficiency when the flux barrier angle $\alpha_F$ of the rotor 120 is in the range around 150° (for example in the range between 148° to 152°). As a result, the interior permanent magnet type BLDC motor capable of reducing the vibration and noise upon being driven can be provided. Throughout the implementations, it is noticed that flux barrier angle may be increased as the number of slots of the stator are increased.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. An interior permanent magnet type brushless direct current (BLDC) motor comprising:
   a stator having a plurality of slots; and
   a rotor positioned in the stator, configured to rotate with respect to the stator, and having a rotor core, a plurality of permanent magnets inserted in the rotor core and a plurality of flux barriers,
   wherein a flux barrier angle of the rotor is determined by multiples of twenty as an electrical angle and the multiples of twenty relates to a number of slots of the stator,
   wherein the multiples of twenty are used when $S_n/(P \times m) = 3n(n=1\ 2\ 3\ \ldots)$ where $S_n$ is the number of slots of the stator, P is a number of poles of the rotor, and m is a number of power phases applied to a stator coil,
   wherein the stator has thirty-six slots, three-phase distributed winding and the rotor has four poles, and
   wherein the flux barrier angle of the rotor is in a range of around 160° as the electrical angle.

2. The motor of claim 1, wherein the flux barrier angle is determined by a size of the flux barriers.

3. An interior permanent magnet type brushless direct current (BLDC) motor comprising:
   a stator having a plurality of slots; and
   a rotor positioned in the stator, configured to rotate with respect to the stator, and having a rotor core, a plurality of permanent magnets inserted in the rotor core and a plurality of flux barriers,
   wherein a flux barrier angle of the rotor is determined by odd multiples of ten as an electrical angle and the odd multiples of ten relates to a number of slots of the stator,
   wherein the odd multiples of ten are used when $S_n/(P \times m) = 2n(n=1,2,3\ \ldots)$ where $S_n$ is the number of slots of the stator, P is a number of poles of the rotor, and m is a number of power phases applied to a stator coil,
   wherein the stator has twenty-four slots, three phase distributed winding and the rotor has four poles, and
   wherein the flux barrier angle of the rotor is in a range of around 150° as the electrical angle.

4. The motor of claim 3, wherein the flux barrier angle is determined by a size of a flux barrier.

* * * * *

UNITED STATES PATENT AND TRADEMARK OFFICE
CERTIFICATE OF CORRECTION

| | | |
|---|---|---|
| PATENT NO. | : 8,193,672 B2 | Page 1 of 1 |
| APPLICATION NO. | : 12/607168 | |
| DATED | : June 5, 2012 | |
| INVENTOR(S) | : Seung-Suk Oh | |

It is certified that error appears in the above-identified patent and that said Letters Patent is hereby corrected as shown below:

In Claim 1, delete "3n(n=1 2 3 . . .)where" and insert -- 3n(n=1,2,3 . . .) where --, therefor.

Signed and Sealed this
Thirteenth Day of November, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,193,672 B2 | |
| APPLICATION NO. | : 12/607168 | |
| DATED | : June 5, 2012 | |
| INVENTOR(S) | : Seung-Suk Oh | |

It is certified that error appears in the above-identified patent and that said Letters Patent is hereby corrected as shown below:

Column 5, line 18 (Claim 1, line 12) delete "3n(n=1 2 3 . . .)where" and insert -- 3n(n=1,2,3 . . .) where --, therefor.

This certificate supersedes the Certificate of Correction issued November 13, 2012.

Signed and Sealed this
Eleventh Day of December, 2012

David J. Kappos
*Director of the United States Patent and Trademark Office*